United States Patent
Dodani et al.

(10) Patent No.: US 11,420,487 B2
(45) Date of Patent: Aug. 23, 2022

(54) METHOD AND APPARATUS FOR MOUNTING A TIRE SENSOR

(71) Applicant: Revvo Technologies, Inc., San Mateo, CA (US)

(72) Inventors: Sunjay Dodani, San Francisco, CA (US); Wing-Hong Andrew Ko, Mountain View, CA (US); Gregory Staples, Petaluma, CA (US)

( * ) Notice: Subject to any disclaimer, the term of this patent is extended or adjusted under 35 U.S.C. 154(b) by 0 days.

(21) Appl. No.: 15/929,988

(22) Filed: Jun. 1, 2020

(65) Prior Publication Data

US 2021/0370726 A1 Dec. 2, 2021

(51) Int. Cl.
*B60C 23/04* (2006.01)

(52) U.S. Cl.
CPC ........ *B60C 23/0493* (2013.01); *B60C 23/041* (2013.01)

(58) Field of Classification Search
CPC .. G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147;
(Continued)

(56) References Cited

U.S. PATENT DOCUMENTS 6,309,494 B1 * 10/2001 Koch .................. B60C 23/0493
156/153
6,462,650 B1 * 10/2002 Balzer ................. B60C 23/0493
152/152.1
(Continued)

FOREIGN PATENT DOCUMENTS

CN    106061763 A  * 10/2016  ......... B60C 23/0493
DE  102008029534 A1 *  2/2009  ......... B60C 23/0411
(Continued)

*Primary Examiner* — Andre J Allen

(57) ABSTRACT

A tire sensor dock for installing an electronic tire sensor module on the inner surface of a tire, including a base portion with an upper side and an underside, the underside configured for affixation on the inner surface of a pneumatic tire, and a body portion integrally formed on the upper side and configured to receive and securely capture a tire sensor in a fixed position and unchanging orientation relative to the tire sensor dock. The tire dock may include an energy generator which converts tire kinetic energy into electrical current provided to the tire sensor module.

16 Claims, 7 Drawing Sheets

(58) Field of Classification Search
CPC .. G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06; B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0411; B60C 23/20; B60C 23/0444; B60C 23/0462; B60C 11/24; B60C 23/064; B60C 23/007; B60C 23/0479; B60C 23/062; B60C 23/003; B60C 23/0401; B60C 23/0413; B60C 23/0488; B60C 23/0498; B60C 23/043; B60C 23/06; B60C 23/0452; B60C 23/0467; B60C 11/246; B60C 23/02; B60C 99/006; B60C 23/0428; B60C 23/0442; B60C 23/009; B60C 23/0425; B60C 2019/004; B60C 23/004; B60C 11/243; B60C 23/045; B60C 23/0464; B60C 23/0472; B60C 23/066; B60C 23/0403; B60C 23/0406; B60C 29/02; B60C 11/00; B60C 23/006; B60C 23/044; B60C 23/00; B60C 23/0455; B60C 23/008; B60C 23/0454; B60C 23/0461; B60C 23/0415; B60C 23/0474; B60C 23/0489; B60C 23/0491; B60C 25/002; B60C 29/064; B60C 23/0483; B60C 11/0318; B60C 23/0459; B60C 23/0471; B60C 23/0481; B60C 23/042; B60C 23/12; B60C 2019/005; B60C 23/002; B60C 23/0422; B60C 23/0423; B60C 23/0466; B60C 2200/02; B60C 23/0405; B60C 23/0477; B60C 29/06; B60C 13/001; B60C 23/0476; B60C 25/132; B60C 23/0437; B60C 23/0447; B60C 23/0427; B60C 23/0449; B60C 25/00; B60C 9/18; B60C 13/00; B60C 19/003; B60C 23/065; B60C 23/0484; B60C 23/0486; B60C 23/08; B60C 17/00; B60C 2019/006; B60C 23/001; B60C 25/142; B60C 17/02; B60C 23/0445; B60C 5/004; B60C 11/0083; B60C 25/145; B60C 29/00; B60C 9/02; B60C 11/0332; B60C 23/0418; B60C 23/0457; B60C 25/18; B60C 11/13; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/04985; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/067; B60C 23/18; B60C 250/02; B60C 7/12; B60C 11/02; B60C 17/0009; B60C 19/002; B60C 19/08; B60C 19/12; B60C 2019/007; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2011/0358; B60C 2011/1254; B60C 2017/068; B60C 2200/06; B60C 2200/12; B60C 2200/14; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22

USPC .................................................. 73/146–146.8

See application file for complete search history.

(56) References Cited

U.S. PATENT DOCUMENTS

| | | | | |
|---|---|---|---|---|
| 6,546,982 | B1 * | 4/2003 | Brown | B60C 23/0433 29/601 |
| 6,885,291 | B1 * | 4/2005 | Pollack | B60C 23/0493 340/447 |
| 2006/0038670 | A1 * | 2/2006 | Kashiwai | B60C 23/0408 340/442 |
| 2008/0083482 | A1 * | 4/2008 | Logan | B29C 66/8266 156/110.1 |
| 2014/0130357 | A1 * | 5/2014 | Hinque | B29D 30/0654 29/894.3 |
| 2015/0137420 | A1 * | 5/2015 | Hinque | B60C 23/0493 264/266 |
| 2021/0129601 | A1 * | 5/2021 | Ferry | G01L 17/00 |

FOREIGN PATENT DOCUMENTS

| | | | | |
|---|---|---|---|---|
| EP | 1684997 B1 * | 5/2007 | ........ | B60C 23/0493 |
| EP | 3677416 A1 * | 7/2020 | ........ | B60C 23/0493 |
| EP | 3763552 A1 * | 1/2021 | ........ | B60C 23/0493 |
| FR | 3058677 A1 * | 5/2018 | ........ | B29D 30/0061 |
| WO | WO-2013005639 A1 * | 1/2013 | ............ | B60C 19/00 |
| WO | WO-2020070951 A1 * | 4/2020 | ............ | B60C 19/00 |

* cited by examiner

METHOD AND APPARATUS FOR MOUNTING A TIRE SENSOR

CROSS REFERENCES TO RELATED APPLICATIONS

Not applicable. The present application is a first-filed United States Non-Provisional (Utility) patent application.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

SEQUENCE LISTING

Not applicable.

BACKGROUND OF THE INVENTION

Field of the Invention: The invention relates most generally to methods of mounting electronic tire sensor modules in pneumatic vehicle tires, and more particularly to a tire patch sensor dock for mounting a sensor module that includes transceivers, antennas, and one or more tire condition sensors.

Background Discussion: Tire sensor systems are now well known. To improve both safety and vehicle performance, numerous tire conditions can be detected and measured with one or more tire-mounted sensors, and the relevant data can then be transmitted from the tire sensor system to a receiving unit and/or central control unit, either in the vehicle or remote. Tire conditions typically monitored with such electronic units include tire pressure, temperature, acceleration, speed, inertia, sidewall stress, and tire wear. Incorporating sensor mounting structure at the time of tire manufacture is also known. However, both original and aftermarket mounting structure can be expensive and involve time-consuming fabrication and installation methods. The present invention is therefore directed to providing a tire sensor dock and a method of mounting the tire sensor dock on the inner surface of a tire in roughly 30 seconds, such that the installation is permanent and conforms in its physical and performance characteristics to the tire and thus and does not adversely affect tire performance.

BRIEF SUMMARY OF THE INVENTION

A tire sensor dock for installing an electronic tire sensor module on the inner surface of a tire that includes a base portion with an upper side and an underside, the underside configured for affixation on the inner surface of a pneumatic tire; and a body portion integrally formed on the upper side and configured to receive and securely capture a tire sensor in a fixed position and unchanging orientation.

In embodiments, the tire sensor dock also includes an adhesive compound which is applied to the underside of the base. The adhesive compound is formulated to cross-link the underside of the base with the inner surface of the tire, which in most instances of tubeless pneumatic tires will be an inner liner.

In embodiments, the tire sensor dock is fabricated from natural or synthetic rubber and the body portion and the base portion are integrally formed as a unitary structure. When so fabricated, it is advantageous to use a vulcanizing rubber cement as the adhesive compound.

In embodiments the tire sensor dock may have a durometer Shore hardness of 40-80, which is in the range most likely to match the physical characteristics of the tire, and therefore after cross linking to provide a close match to tire performance characteristics. In its implementation, the tire sensor dock can be fabricated at numerous different harness ratings, and the technician carrying out the installation simply carries out the closest durometer Shore hardness match.

In embodiments, the body is configured to define a hollow interior into which an electronic tire sensor module is installed. The hollow interior is preferably configured to prevent rotation of the sensor module, which would affect the accuracy of the data obtained and the harvesting or scavenging of power by a power generator. The fixed orientation can be accomplished by providing a surface feature on an interior wall of the body portion which cooperates with a complementary feature on the sensor module to lock the module in its orientation. In its simplest iteration, that surface feature can be a radially extending boss.

In embodiments, the tire sensor dock can include an electric power generator, such as an energy-harvesting or energy-scavenging system which converts the kinetic energy of tire rotation into electric energy. In embodiments it may comprise a fixed coil/moving magnet generator having a housing with one or more wire coils disposed in the housing. As the tire rotates, the kinetic energy of the tire rotation moves at least one movable magnet in relation to at least one fixed coil electrically coupled to the sensor system. As is well known, an electrical current is generated in the wire coil(s) when the magnet(s) pass by the coil(s). However, those with skill will understand, any of a number of energy-harvesting or energy-scavenging systems might be employed to convert the kinetic energy of tire rotation into the modest electric power required by a tire sensor package.

Also disclosed here is a method for installing the inventive tire sensor dock on the interior surface of a pneumatic tire. In a most essential aspect, the method involves providing the above-described tire sensor dock in a durometer shore hardness substantially identical to that of the inner surface of the tire (typically Shore 40-80), selecting and providing a bonding composition suitable for forming a cross-linked bond between the base of the tire dock and the inner surface of the tire. Thus, the tire dock may be adapted according to known tire formulations generally and/or specific tire formulations for close matching. The bonding composition is applied to the underside of the base, and the base of the tire dock is then applied to the inner liner of a tire at the circumferential (longitudinal) center line of the interior surface of the tire so as to cross-link the underside of the base and the inner liner of the tire. After curing the tire sensor dock is permanently affixed to the inner surface of the tire. When so cross-linked, the physical and performance characteristics of the tire sensor dock and the tire inner surface are closely matched. In embodiments, the bonding composition is a rubber cement, and preferably a vulcanizing rubber cement. In embodiments the rubber material of the tire sensor dock body has a stiffness within 10% of a stiffness of the inner surface of the tire.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

Accordingly, before explaining the embodiments of the disclosure in detail, it is to be understood that the disclosure is not limited in its application to the details of the construction and the arrangements set forth in the following description or illustrated in the drawings. The inventive apparatus described herein is capable of other embodiments and of being practiced and carried out in various ways. As such, those skilled in the art will appreciate that the conception upon which this disclosure is based may readily be used as a basis for designing other structures, methods, and systems for carrying out the several purposes of the present invention. It is important, therefore, that the claims are regarded as including such equivalent constructions as far as they do not depart from the spirit and scope of the present invention. Rather, the fundamental aspects of the invention, along with the various features and structures that characterize the invention, are pointed out with particularity in the claims annexed to and forming a part of this disclosure. For a better understanding of the present invention, its advantages and the specific objects attained by its uses, reference should be made to the accompanying drawings and descriptive matter in which there are illustrated the preferred embodiment.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1A:
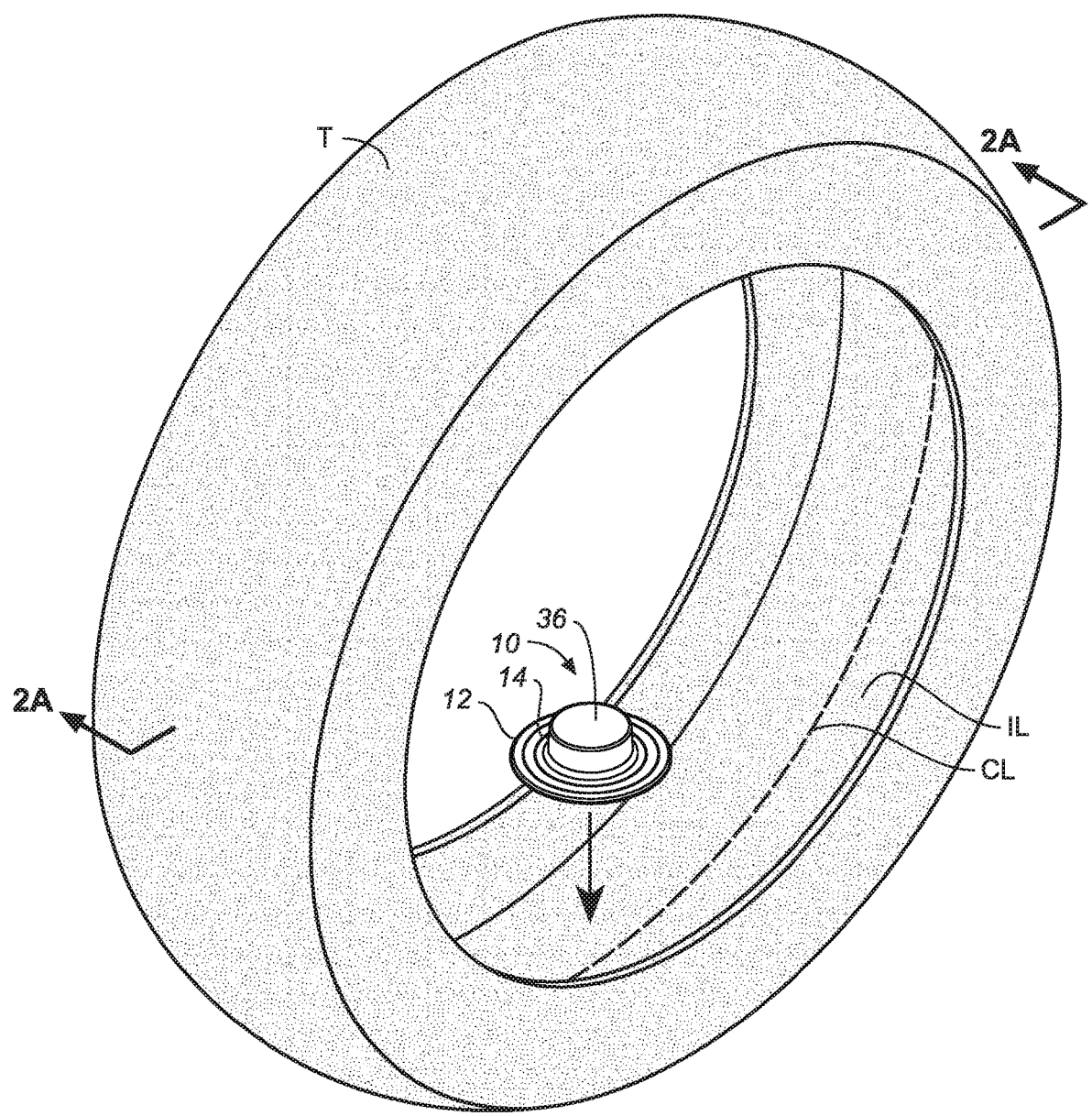
FIG. 1A is an upper perspective view of an embodiment of the tire sensor dock of the present invention, poised for installation on the centerline of an inner liner of a pneumatic vehicle tire.
Figure 1B:
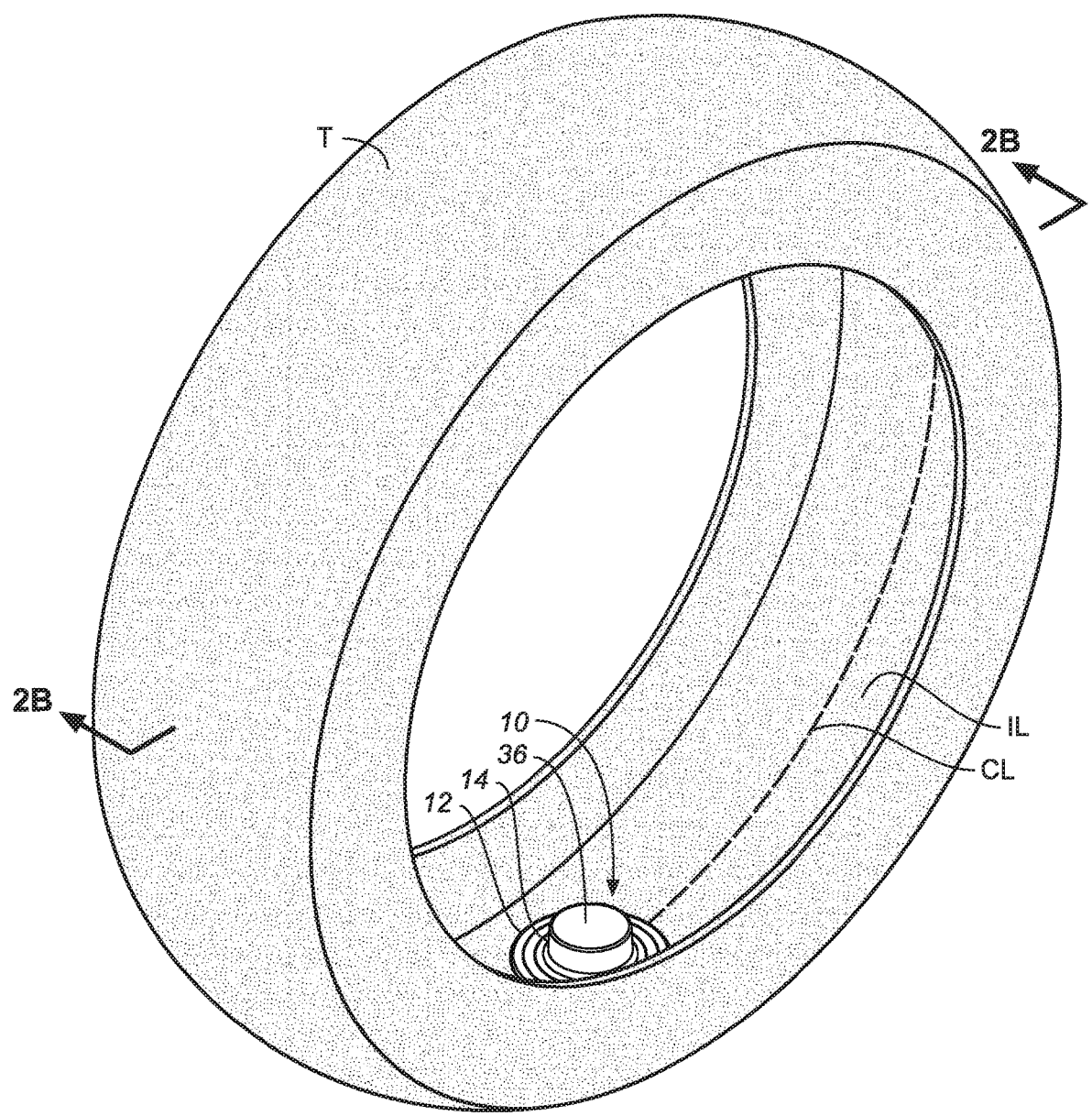
FIG. 1B is the same view showing the tire sensor dock installed in and on the tire.
Figure 2A:
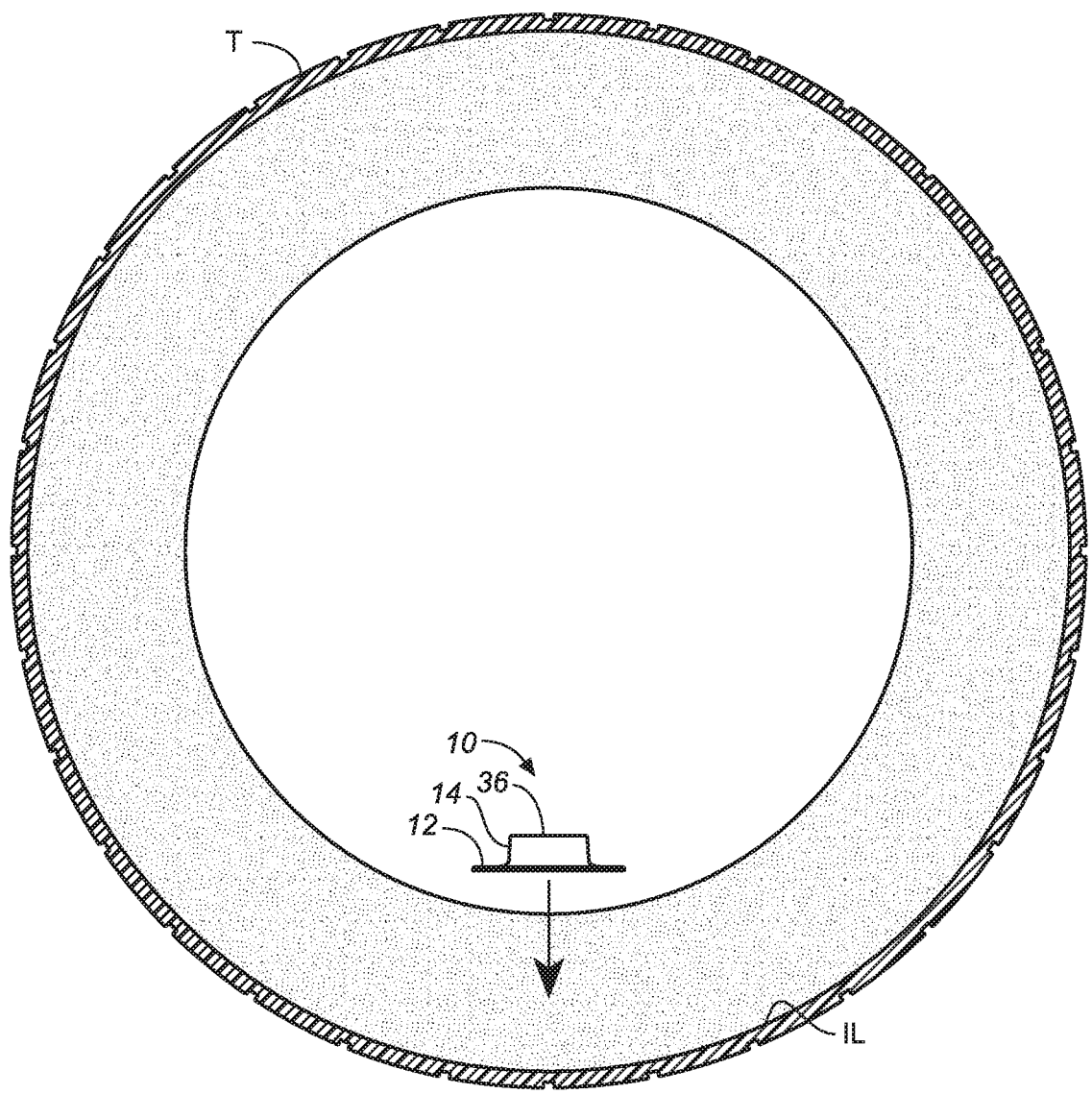
FIG. 2A is a cross-sectional side view in elevation of the tire and tire sensor dock taken along section line 2A-2A of FIG. 1A.
Figure 2B:
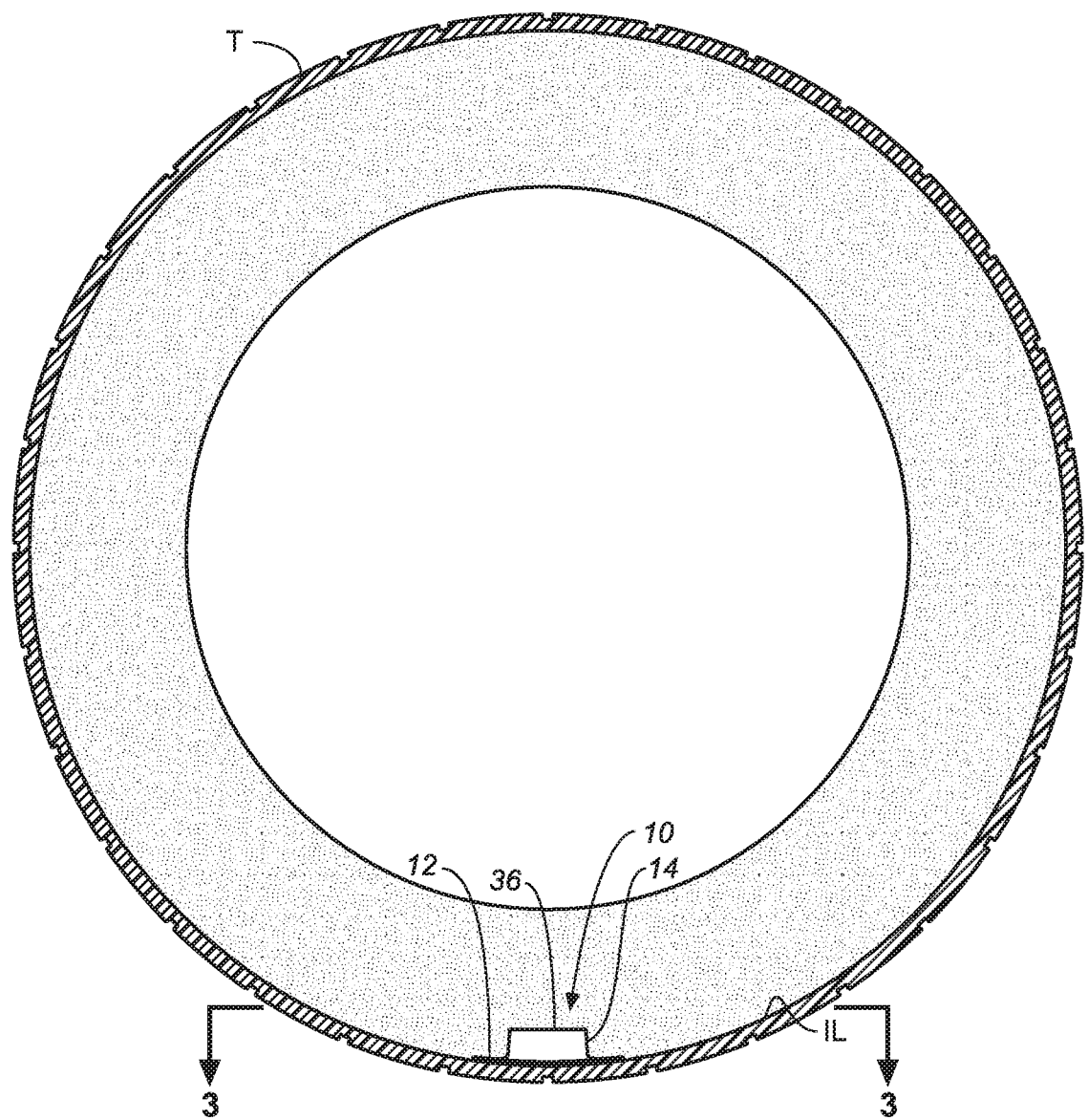
FIG. 2B is the same view showing taken along section line 2B-2B of FIG. 1B.
Figure 3:
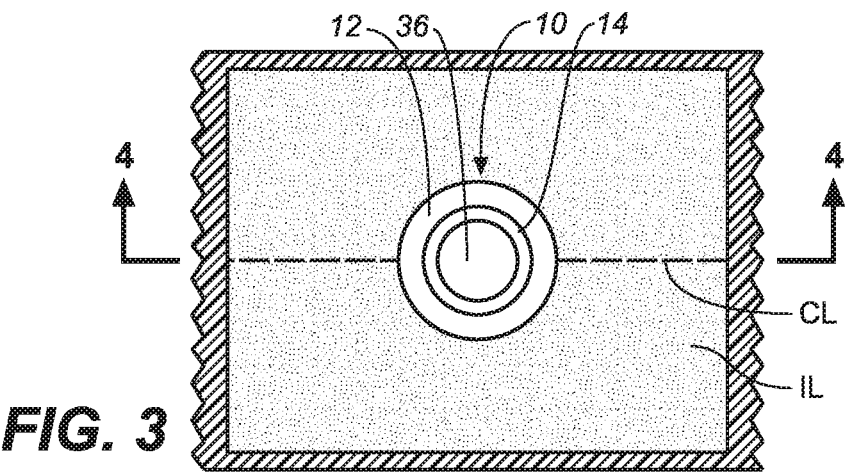
FIG. 3 is a detailed top plan view showing the tire sensor dock installed on the inner liner of a pneumatic tire.
Figure 4:
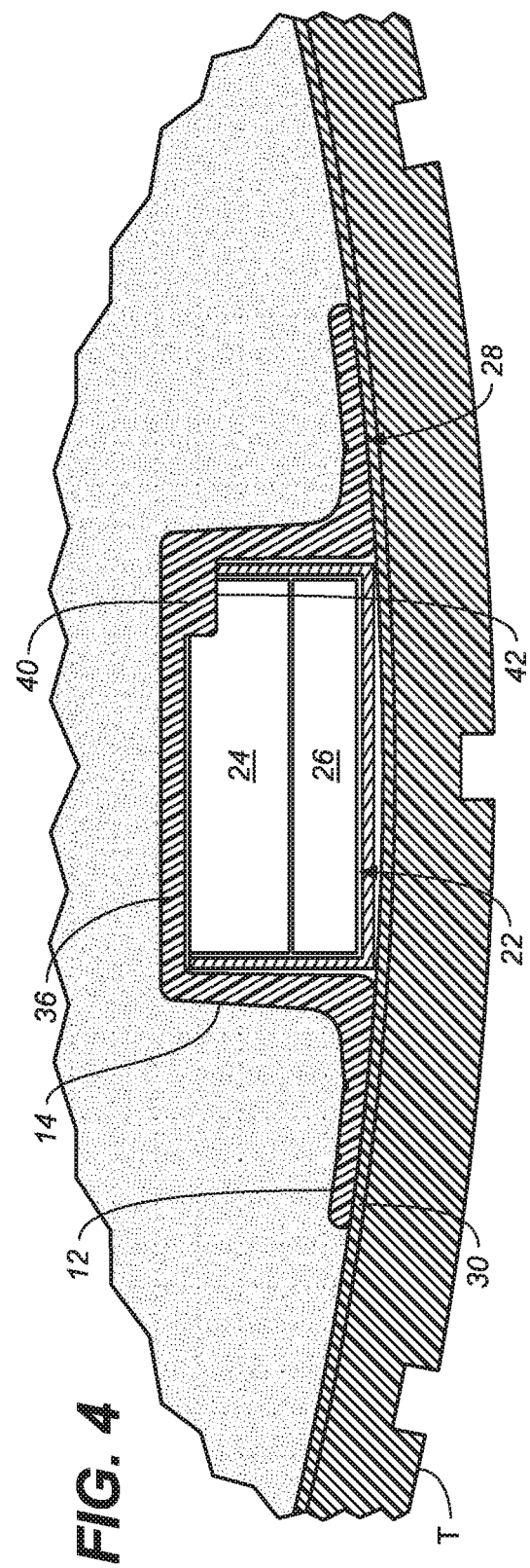
FIG. 4 is a detailed cross-sectional side view in elevation as taken along section line 4-4 of FIG. 3.

Referring to FIGS. 1A through 5C, wherein like reference numerals refer to like components in the various views, there is illustrated therein a new and improved tire sensor dock and a method of installing the same on the inner surface of a pneumatic tire. The invention is generally denominated 10 herein.

FIGS. 1-4 illustrate an embodiment of the tire sensor dock of the present invention. Collectively, these views show that the inventive apparatus includes a substantially planar base portion 12, a solid disc in some embodiments and a ring in others, and a body portion 14 centrally positioned on the base portion. In an embodiment, the body portion includes a cylindrical wall 16 extending generally normal to the upper side 18 of the base portion. In embodiments, the body and base portions are integrally formed of rubber, which may be butyl rubber or any of a number of elastomeric materials suitable for application on a tire inner surface using The body portion is preferably sized such that the base portion includes a skirt or apron 20 surrounding the lower body portion. In other embodiments, the body portion may take any of a number of suitable polyhedral shapes, which can be vertically bisected into equal halves. The body portion defines an interior volume 22 configured to accept and retain an electronic tire sensor module 24, which minimally includes at least one sensor and a transceiver unit, the module electronically coupled to a power supply 26. The power supply may be inboard or outboard, i.e., incorporated into the module housing or disposed outside the tire dock body on the upper surface of the base portion, though preferably the entire sensor package (module and power supply) are enclosed in the interior volume of the body portion.

As will be appreciated, the base portion 12 in the embodiment of FIGS. 1A-4 is annular, substantially normal to the wall of the body portion and circumferentially surrounding it. The underside 28 of the base portion is also substantially planar, configured for affixation on the inner liner IL of a tire T with an adhesive composition that induces a cross-linking vulcanizing effect on the tire dock material and the surface of the inner liner, thereby forming a chemically cross-linked bonded region 30 where the inner liner and base portion are approximated. In an embodiment (FIG. 4), the approximated surfaces of the underside of the skirt 20 and the inner liner form the cross-linked region. That region is expanded in another embodiment, as discussed below.

The tire dock is positioned across the longitudinal and circumferential center line CL of the inner surface of the tire such that the centerline geometrically bisects a geometric center 32 of the base portion and a vertical centerline 34 of the body portion. When installed, the circumferential centerline CL of the tire also geometrically aligns with a centerline bisecting the tire sensor. This ensures a balanced installation of the tire sensor dock and the sensor module contained therein and thus does not adversely affect or compromise tire balance more generally.

The upper end of the body portion may be closed with a sealed top 36 covering the sensor module, or it may be open (as seen in the embodiment 50 shown in FIGS. 5A-5C, and as discussed more fully below). In cylindrical embodiments, the interior wall 38 of the body portion includes a surface feature, such as a boss 40, which engages complementary notch 42 on the sensor module to align the sensor module and to prevent a change in orientation of the module in relation to the tire sensor dock and thus to the tire. Of course, the elements may be reversed, such that the module includes a boss and the body portion interior surface include a notch, with the objective also realized. If the body portion is a polyhedral enclosure, a sensor module having an exterior configuration adapted for a wall-to-wall fit in the body portion will naturally be secured so as to prevent any rotation or misalignment of the sensor module.

Figure 5A:
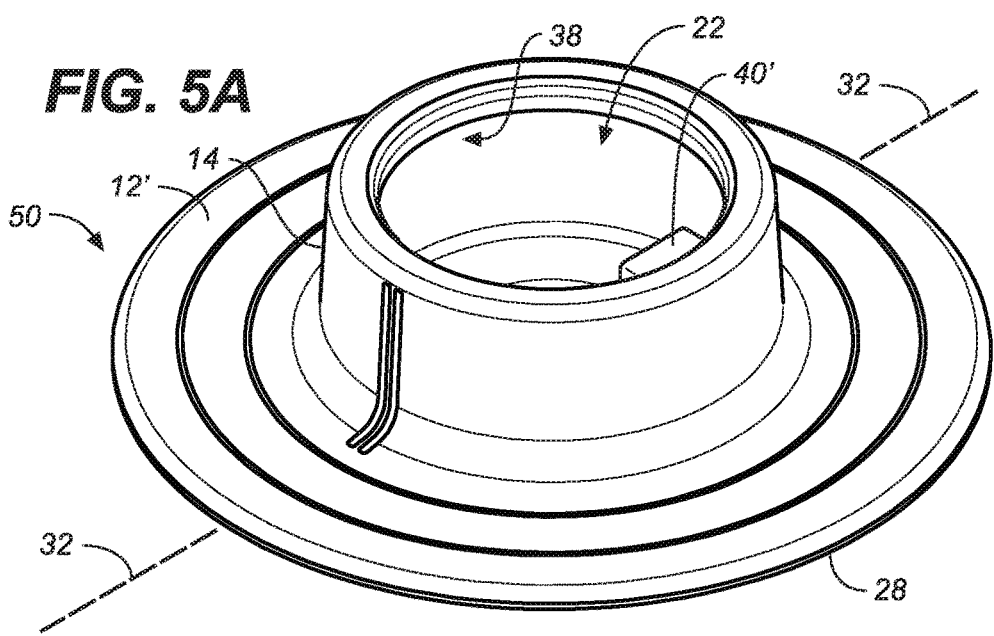
FIG. 5A is an upper perspective view of an alternative embodiment of the tire sensor dock shown with an open (unsealed) top.
Figure 5B:
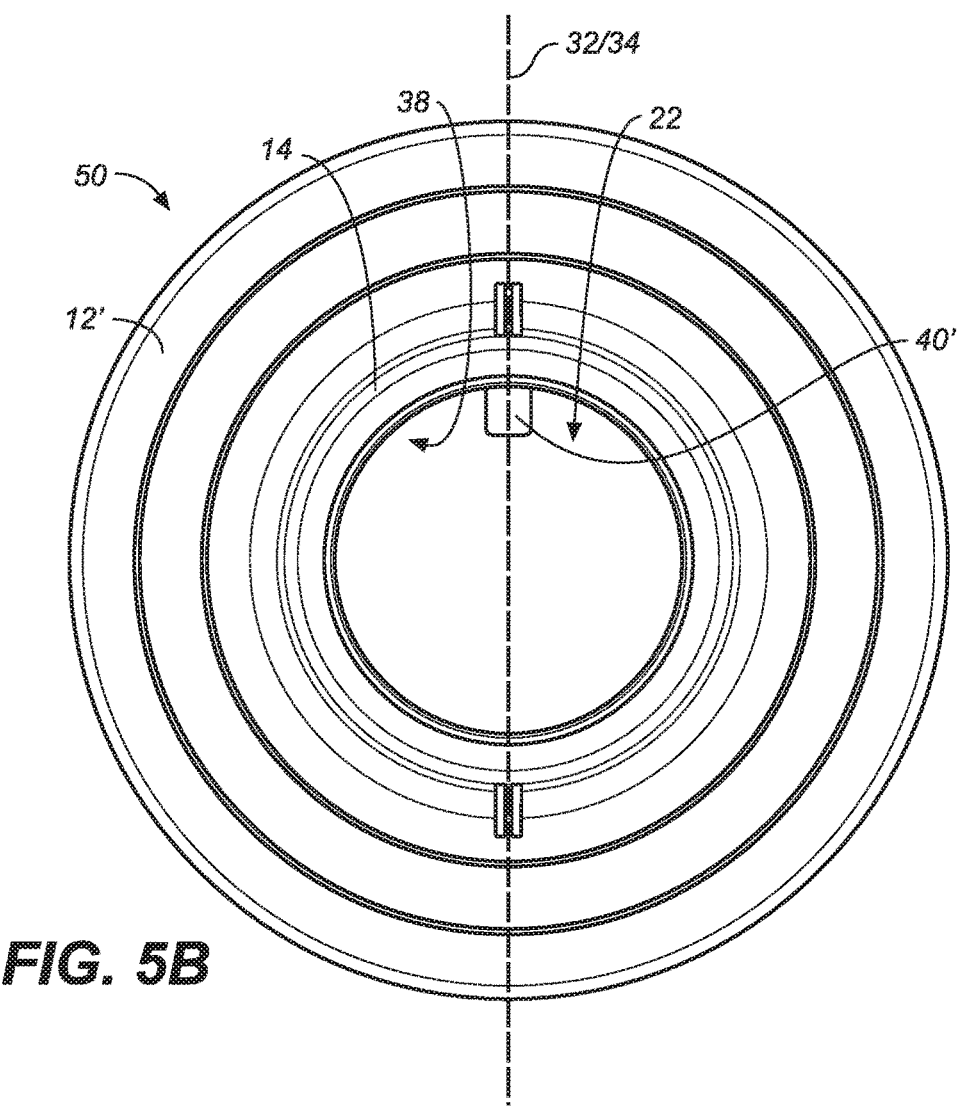
FIG. 5B is a top plan view thereof.
Figure 5C:
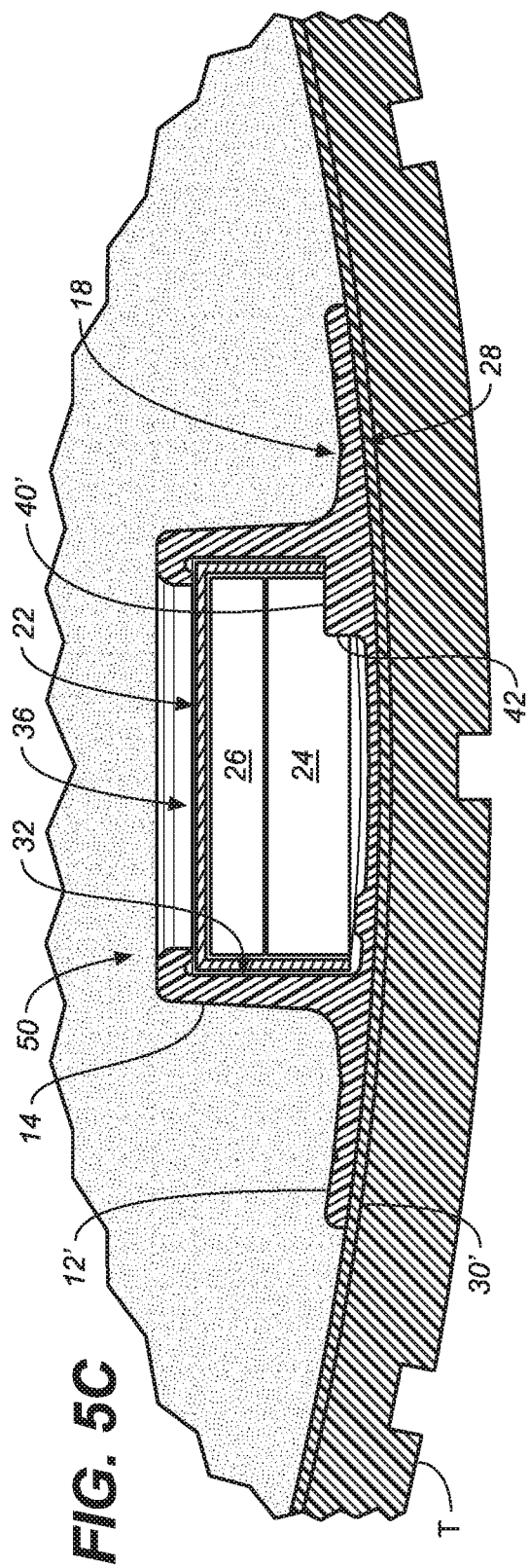
FIG. 5C is a cross-sectional side view in elevation taken along section line 5C-5C of FIG. 5B.

In an alternative embodiment 50, shown in FIGS. 5A-5C, the top 36' of the body portion is open and the base portion 12' is continuous circular disc, and the cross-linked region 38' is correspondingly expanded. The boss 40' for engaging the notch 42 in the sensor module is moved to an alternative position, i.e., a lower portion of the interior volume of the body portion, 14. Otherwise, where reference numbers designate features shared with the earlier embodiment, the reference numbers are promoted for ease of review. It will be appreciated by those with skill that the location of the boss is adapted for the orientation and installation of the sensor module without altering its function nor affecting its operability.

The above disclosure is sufficient to enable one of ordinary skill in the art to practice the invention and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A method of installing and securing a tire sensor dock to an inner surface of a pneumatic tire, comprising:
    providing a rubber tire sensor dock having an annular base with an upper side and an underside, and a body portion on the upper side, the body portion defining a hollow cylindrical interior volume shaped to receive a tire sensor and having a boss or notch surface feature on the interior sidewall of the hollow cylindrical interior volume configured to cooperate with a complementary notch or boss surface feature on a tire sensor module to prevent rotation of the tire sensor module in the interior cylindrical cavity when installed, the underside configured for affixation on the inner surface of a pneumatic tire;
    providing a bonding composition suitable for forming a cross-linked bond between the base and inner surface of the tire;
    applying the bonding composition to the underside of the base; and
    applying the base to the inner surface of the tire so as to cross-link the underside of the base and the inner surface of the tire such that the tire sensor dock is permanently affixed to the inner surface of the tire.

2. The method of claim 1, wherein the bonding composition is a rubber cement.

3. The method of claim 2, wherein the rubber cement is a vulcanizing rubber cement.

4. The method of claim 2, wherein the body and the base of the tire sensor dock body have a stiffness within 10% of a stiffness of the inner surface of the tire.

5. The method of claim 4, wherein the tire sensor dock has a durometer Shore hardness of 40-80.

6. The method of claim 1 further including bonding the tire sensor dock on the circumferential (longitudinal) center line of the interior surface of the tire.

7. A tire sensor dock for installing an electronic tire sensor module on the inner surface of a tire, comprising:
    a base portion with an upper side and an underside, said underside configured for affixation on the inner surface of a pneumatic tire; and
    a body portion integrally formed on said upper side and configured to define a hollow cylindrical interior volume and an interior surface to receive and securely capture a tire sensor in a fixed position and unchanging orientation;
    wherein said hollow cylindrical interior volume includes a surface feature on said interior surface configured to cooperate with a complementary surface feature on the outer side of the tire sensor module to fix the orientation of the tire sensor module and to prevent rotation of the sensor module within said hollow cylindrical interior volume.

8. The tire sensor dock of claim 7, further including an adhesive compound for application to said underside of said base, said adhesive compound formulated for cross-linking said underside with the inner surface of the tire.

9. The tire sensor dock of claim 7, wherein said body portion and said base of said tire sensor dock are integrally formed as a unitary structure fabricated from rubber.

10. The tire sensor dock of claim 9, wherein said adhesive compound is a vulcanizing rubber cement.

11. The tire sensor dock of claim 9, wherein said rubber has a durometer Shore hardness of 40-80.

12. The tire sensor dock of claim 7, wherein said surface feature is a radially disposed boss or a radially disposed notch.

13. The tire sensor dock of claim 7, further including an energy generator.

14. The tire sensor dock of claim 13, wherein said energy generator is an energy-scavenging system.

15. The tire sensor dock of claim 14, wherein said energy scavenging system includes:
    a housing having;
    at least one wire coil disposed in said housing so as to have a fixed position with respect to said housing;
    at least one magnet movable in relation to said at least one wire coil;
    wherein said at least one movable magnet is positioned such that it passes by said at least one wire coil as the tire sensor dock rotates about the wheel of a vehicle so as to generate an electrical current.

16. The tire sensor dock of claim 15, wherein said energy generator is configured for electronic connection to said tire sensor to provide power to said tire sensor.

* * * * *